United States Patent
Zhang et al.

(10) Patent No.: US 9,773,109 B2
(45) Date of Patent: *Sep. 26, 2017

(54) ALTERNATE FILES RETURNED FOR SUSPICIOUS PROCESSES IN A COMPROMISED COMPUTER NETWORK

(71) Applicant: Acalvio Technologies, Inc., Cupertino, CA (US)

(72) Inventors: Yadong Zhang, Sunnyvale, CA (US); Ching-Hai Tsai, San Jose, CA (US); Johnson L. Wu, Sunnyvale, CA (US); Craig A. Schultz, Danville, CA (US)

(73) Assignee: Acalvio Technologies, Inc., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/400,799

(22) Filed: Jan. 6, 2017

(65) Prior Publication Data

US 2017/0206349 A1    Jul. 20, 2017

Related U.S. Application Data

(63) Continuation of application No. 14/503,014, filed on Sep. 30, 2014, now Pat. No. 9,576,145.

(60) Provisional application No. 61/884,734, filed on Sep. 30, 2013.

(51) Int. Cl.
*G06F 21/50* (2013.01)
*G06F 21/55* (2013.01)
*G06F 21/62* (2013.01)

(52) U.S. Cl.
CPC .......... *G06F 21/55* (2013.01); *G06F 21/6218* (2013.01)

(58) Field of Classification Search
CPC .......... G06F 21/60; G06F 21/55; H04L 63/14
See application file for complete search history.

(56) References Cited

U.S. PATENT DOCUMENTS

| 2006/0112418 | A1* | 5/2006 | Bantz ...................... G06F 21/88 726/4 |
| 2010/0115614 | A1* | 5/2010 | Barile ................... G06F 21/552 726/22 |
| 2015/0096048 | A1 | 4/2015 | Zhang et al. |

OTHER PUBLICATIONS

U.S. Appl. No. 14/503,014, "Non-Final Office Action", Mar. 25, 2016, 9 pages.

(Continued)

*Primary Examiner* — Izunna Okeke
(74) *Attorney, Agent, or Firm* — Kilpatrick Townsend & Stockton LLP

(57) ABSTRACT

Methods and systems are presented of presenting false and/or decoy content to an intruder operating on a computer system by obfuscating critical files on a computer storage device with data that directs subsequent infiltration and propagation to designated decoy hosts and decoy applications.

Method and systems are provided for selectively presenting different contents to different viewers/users of application resource files for the purpose of preventing the valuable content from being read, tampered with, exfiltrated, or used as a means to perform subsequent attacks on network resources.

17 Claims, 5 Drawing Sheets

(56) References Cited

OTHER PUBLICATIONS

U.S. Appl. No. 14/503,014 , "Notice of Allowance", Oct. 7, 2016, 10 pages.
U.S. Appl. No. 14/503,014 , "Supplemental Notice of Allowance", Nov. 23, 2016, 3 pages.
Jayanthi , "Digital bread crumbs", Seven clues to identify who is behind advanced cyber attacks, Sep. 24, 2013, 4 pages.

\* cited by examiner

ALTERNATE FILES RETURNED FOR SUSPICIOUS PROCESSES IN A COMPROMISED COMPUTER NETWORK

CROSS-REFERENCES TO RELATED APPLICATIONS

This application is a continuation of U.S. patent application Ser. No. 14/503,014 filed Sep. 30, 2014, which claims benefit of U.S. Provisional Patent Application No. 61/884,734 filed Sep. 30, 2013.

COPYRIGHT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Field of the Art

The technology described here generally relates to computer networking, and, more specifically, to computer file obfuscation using file system filter drivers at the operating system-level.

2. Description of the Related Art

Conventional computer data security involves the deployment of firewalls, content inspection gateways, authentication and encryption schemes, in addition to network and host-based intrusion detection systems.

Such reactive approach has had limited success against the newer types of intrusion commonly known as Advanced Persistent Threats (APTs). Another approach is to use hosted decoys or more commonly known as honeypot systems populated with varying degrees of realism, some going as far as populating such honeypot hosts with believable data for the intruder to stay connected and remain active.

"Digital bread crumbs" refers to a host of clues left behind by a hacker, as mentioned in Jayanthi, Sridhar "Digital Bread Crumbs: Seven Clues To Identify Who Is Behind Advanced Cyber Attacks," *Information Week*, Jul. 19, 2013, at http://www.informationweek.in/security/13-07-19/digital_bread_crumbs_seven_clues_to_identify_who_is_behind_advanced_cyber_attacks.aspx. Conversely for the purpose of counter intelligence, clues can be deliberately left on a computing device to attract an intruder to lead him to take certain actions which will reveal themselves and subject their actions to scrutiny and containment.

More efficient network protection from hackers is sought. There is a need to protect the computer networks against advanced persistent threats and other attacks.

BRIEF SUMMARY

Generally, embodiments of the invention are related securing hosts on computer networks by misleading intruders who have gained access to a host computer to take certain actions a normal user would not. The same technology can help secure valuable resources by obfuscating critical files on the host computer in a way that the content of files viewed by the intruder is different from that seen by the legitimate user.

A file system filter driver is installed between the file system of an operating system and processes of applications. The file system filter driver intercepts requests from processes to the file system to read and/or open files. If a file has a particular attribute, such as a particular file extension, then attributes of the process are identified. If those attributes, such as its size, location, description, creation or modification date, visibility setting, usage, creator, registry path, etc., indicate that it is a suspicious process, then the read request is altered by the file system filter driver to point to a different file. That is, instead of the file that was requested, a different file is planted into the request. The file system then returns the different file to the process than the one that was originally requested.

The different file can include deliberate clues for a hacker to find in order to lead him or her to a different part of the networked computer system.

A production-client intrusion entrapment add-on, sometimes referred herein as an "agent," can be installed on a user-operated client computers and programmed to enhance the effectiveness of honeypots and decoy hosts by encouraging an attacker residing in compromised real clients to connect to one or more hosts presented by the honey net.

A hacker on a compromised production host is typically inclined to connect to peers and server resources that legitimate users of the compromised client has recently accessed. By providing a trail of breadcrumbs and occasional appearance of fishing lines, the agent serves to convince the attacker that a decoy host is a network resource of value.

Some embodiments of the invention are related to a method of obscuring computer files from hackers in a computer. The method includes monitoring read requests to a file system of a computer operating system, intercepting, at a software filter, a first read request for a first file before the first read request reaches the file system, ascertaining a file attribute of the first file to which the first read request is directed, identifying a process executable that posted the first read request, determining a security rating of the process executable, comparing the security rating to a threshold, revising, at the software filter, the first read request into a second read request, the revising based on the file attribute of the first file and the comparison, and sending the second read request to the file system.

Some embodiments are related to a method of obscuring registry entries from hackers in a computer. The method includes monitoring read requests to a registry system of a computer operating system, intercepting, at a software filter, a read request for a registry entry before the request reaches the registry system, ascertaining an attribute of the registry entry to which the read request is directed, identifying a process executable that posted the read request, determining a security rating of the process executable, comparing the security rating to a threshold, and revising, at the software filter, the read request based on the attribute and the comparison.

DETAILED DESCRIPTION

Figure 1:
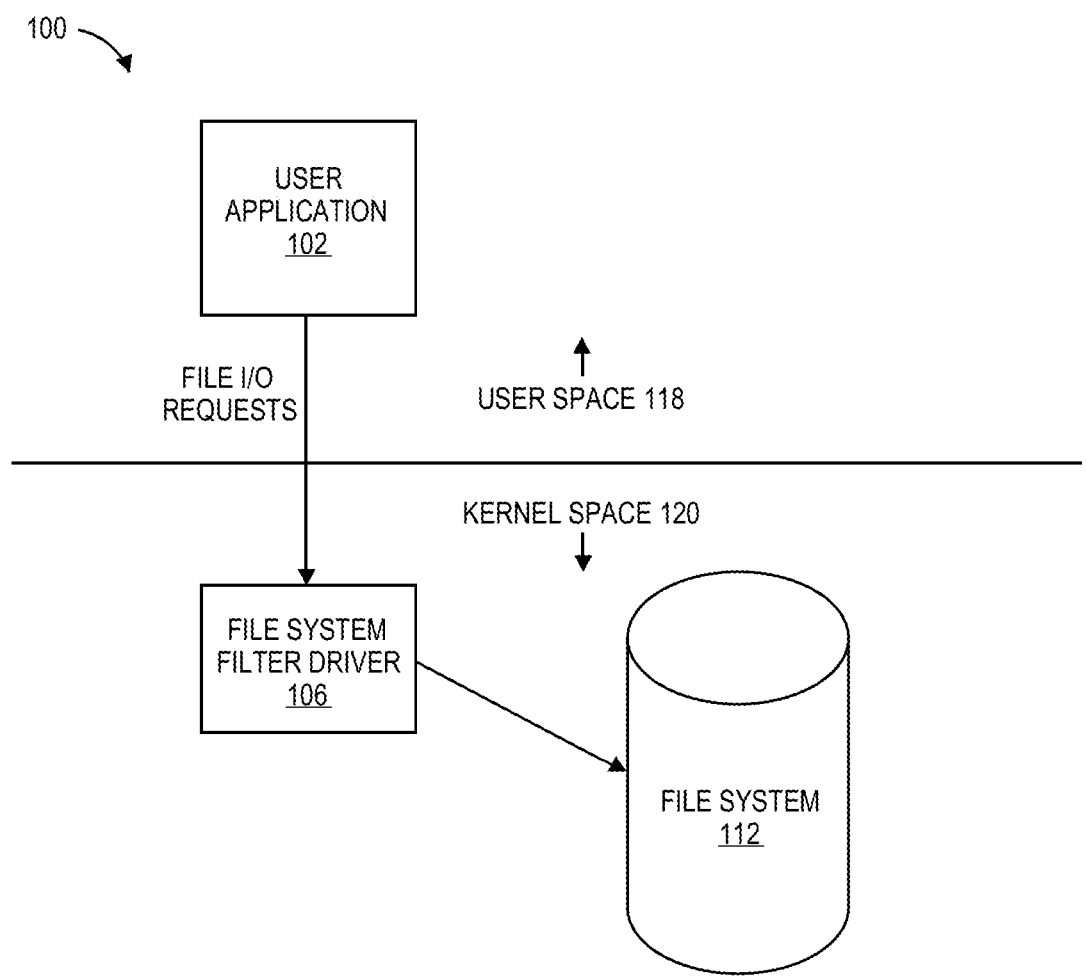
FIG. 1 illustrates a file system filter driver in accordance with an embodiment.

Generally, embodiments work as follows. When a legitimate user uses a legitimate application to access a file, the file is returned. However, when an illegitimate user, such as a computer hacker, uses an illegitimate application or process to access the same file, a different file is returned. This is accomplished by using a file system filter driver in the kernel space of memory that intercepts requests from applications meant for the file system. The file system filter driver, sometimes referred to as a "shim," alters those requests to point to a different files than the ones requested, thereby obscuring the real files from the hacker.

A software "shim" is a relatively small executable or library of executables that transparently intercepts a message intended for an application programming interface (API) and changes the parameters passed, handles the operation itself, or redirects the operation elsewhere.

A software "process" includes an executable, contained portion of code that is recognized and executed as one entity by an operating system, or as otherwise known in the art. For example, on a personal computer running a Microsoft Windows® operative system, pressing Ctrl-Alt-Delete, starting the Windows Task Manager, and then selecting the 'Processes' tab shows processes currently loaded and running. A process may be in a user mode or a kernel mode.

The file system filter driver may leave most of the requests to a file system untouched, ignoring files that are not important to hackers. However, a few important files may have false, shadow files that are presented when it is determined that the request comes from a hacker.

In some embodiments, one can obfuscate configuration files and files containing destination and login information with any false content. A process operated by a legitimate user, such as a remote desktop application running on the computer console itself, will read the original and unobfuscated content. An intruder using a cloaked application to read the file in an attempt to view, edit, or launch a process that uses such a file will get an obfuscated result.

Such obfuscated content may include: remote desktop configuration files; browser history and favorites; registry keys, such as browser auto-fill usernames and passwords; and third party application supplied password files and caches, such as Sharepoint, DNS, and other options.

Such presentation of alternative data to an intruder is accomplished via software file system filter technology that integrates non-intrusively into an operating system such as various versions of Microsoft Windows®, Unix, Linux, MacOS, Android, or iOS operating systems. These operating systems may be used for computers running as web servers and utilizing Internet information services (IIS), Apache, Nginx, etc. as well as other servers and clients.

In one embodiment, the following steps can occur. On a user computer, a file system filter driver is installed by an administrator or a user with equivalent privilege, or through automated provisioning scripts. The installation inserts a file system filter driver that operates between process and file, which will intercept each file read request.

In a normal system, a user executes a process (i.e., from an application), which tries to open a file. E.g., the user double-clicks a remote desktop configuration file, and such action launches an associated application (process), such as mstsc.exe. The installed file system filter captures the request and inspects associated process attributes, such as its executable filename, location, date, time, size, usage, creator, registry path, or checksum. If the process attributes match that which is registered in a whitelist, the driver passes the request to an underlying file system. In this example, the process is verified as the bona fide mstsc.exe, and the remote desktop application reads the original unaltered contents.

Alternatively if a hacker using a trojan process tries to read the configuration file directly, assuming that the trojan does not open application on the user's desktop. The file system filter captures the request, inspects associated process name and identifies it. Because the process attributes do not match any that is registered in whitelist, the driver process responds to request with alternative content. E.g., it is redirected to a different file, whether static or dynamically created.

In the Microsoft Windows® operating system, mstsc.exe is a remote desktop connection application. Some hackers have been known to use it to view files on compromised personal computers (PCs). If mstsc.exe is located in C:\Windows\System32, has a size of 677,888 or 407,552 bytes, and has a visible window, then it is essentially safe. However, if it is located in C:\Documents and Settings or C:\Windows, has other sizes, has a blank description, does not have a digital signature, and/or does not have a visible window, then it can be unsafe. There exists different security ratings for mstsc.exe based on its file size and other attributes.

When mstsc.exe attempts to access a file, it posts a request to the Windows file system to access the file, and Windows returns a handle (address) to the file object. A file system filter driver can intercept the request and revise, delete, etc. it. For example, a filename (or path) within the request can be altered to point to a different file. Instead of returning a handle to "C:\Users\Joe\My Documents\RemoteHost1.rdp," the request can be altered to return a handle to "C:\Spoof\ShadowHost001.rdp." There is nothing immediate to indicate to mstsc.exe that the 'wrong' file is being read.

One may protect users' information by altering requests for files associated with the user, for example, those in a user's desktop folder (e.g., % USERPROFILE %\Desktop), the user's document folder (e.g., % USERPROFILE %\Documents), the path where web browser saves favorites (e.g., % USERPROFILE %\Favorites), the path where web browser stores temporary files and history, and the registry path or database file where web browser stores saved username and password.

Examples of other types of files that the system can obfuscate include: RDP configuration files with the extension ".rdp", which can be located anywhere; autocomplete credentials, normally saved in the registry at"HKEY_CURRENT_USER\Software\Microsoft\Internet Explorer\IntelliForms\Storage2"; IE favorite links, normally saved in the "C:\Users\{username}\Favorites" folder, which is a per user folder and all favorite link files have "url" file extension names; and usernames and passwords managed by the Credential Manager, normally saved in either of the following:

C:\Users\{username}\AppData\Local\Microsoft\Credentials; or

C:\Users\{username}\AppData\Roaming\Microsoft\Credentials.

The figures will now be used to further describe these aspects.

FIG. 1 illustrates a file system filter driver in accordance with an embodiment. A user application executes from a user space of a computer system's memory. A file system occupies a kernel space of memory, and a file system filter driver is installed in the kernel space.

When the user application requests file input/output (I/O), instead of going directly to the file system, this request is intercepted by the file system filter driver. The file system filter driver then sends the request—modified or unmodified depending on whether it is determined that the user application is suspicious—to the file system.

Figure 2:
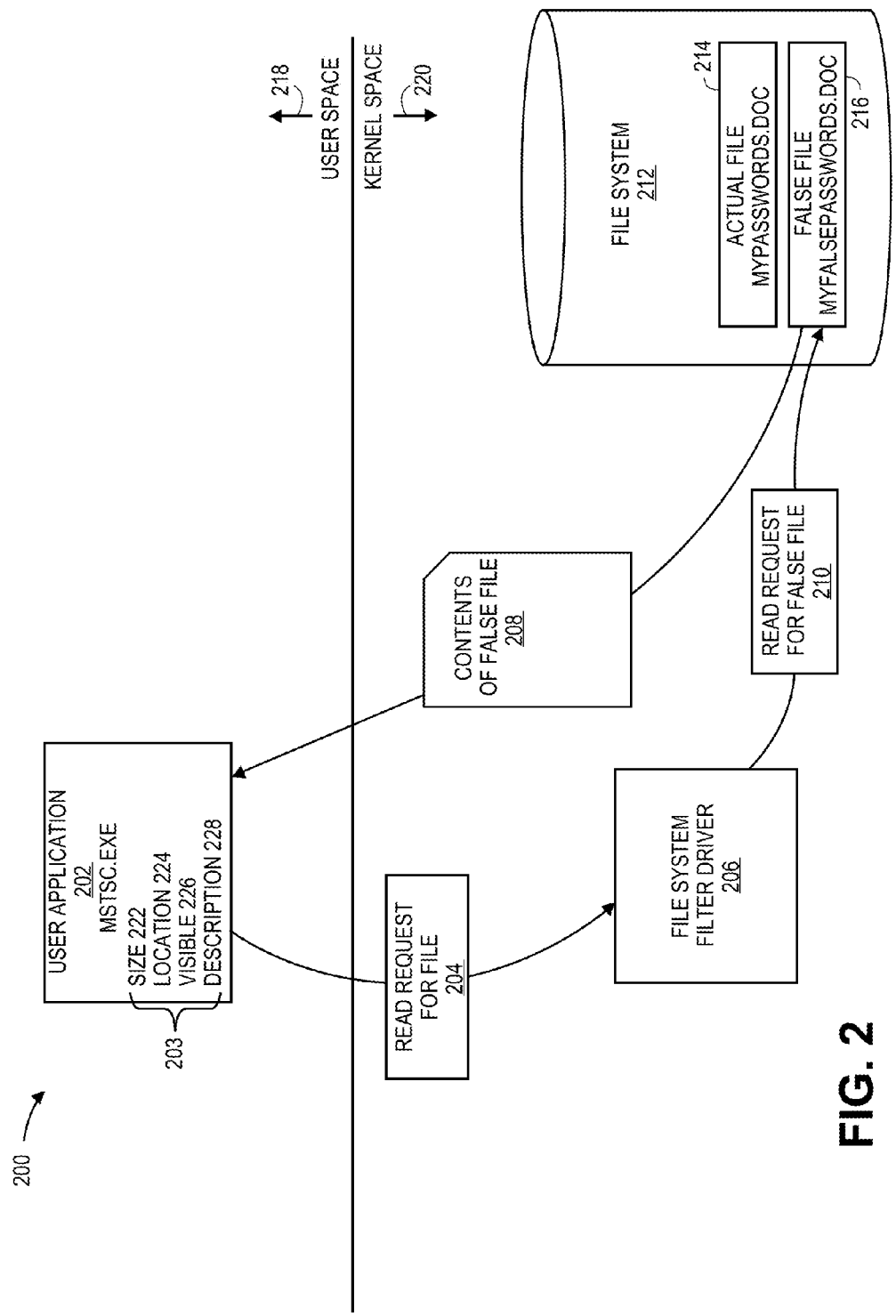
FIG. 2 illustrates spoofing a particular process executable in accordance with an embodiment.

FIG. 2 illustrates spoofing a particular process executable in accordance with an embodiment. In computer system 200, user application 202 executes from user space 218 of a computer system memory. User application 202 is mstsc.exe and has attributes 203 such as its size 222, path location 224, whether it is visible on a user's screen 226, and description 228.

File system 212 occupies kernel space 220 of the computer system memory. File system 212 stores actual, unaltered file 214 and false file 216.

File system filter driver 206 resides in kernel space 220 of the computer system memory. When user application 202 sends or otherwise posts read request 204 for actual file 214, file system filter driver 206 intercepts it. Based on the file extension (i.e., .DOC) of the file requested in read request 204, file system filter driver 206 inspects process 202.

Based on the fact that location 224 is different from the well known location of the mstsc.exe file, and that its visible property 226 is set to 'False,' file system filter driver 206 determines that user application 202 is a high security risk process, deserving of a low security rating. The security rating is below a threshold (e.g., below 10%), so file system filter driver 202 alters the filename within read request 204 to create read request 210. Read request 210, with the false filename, is sent on to file system 212. Based on the filename in read request 210, file system 212 sends contents 208 of false file 216 back to user application 202. The hacker reads the false passwords from the file, and the actual file's passwords are kept safe.

Figure 3:
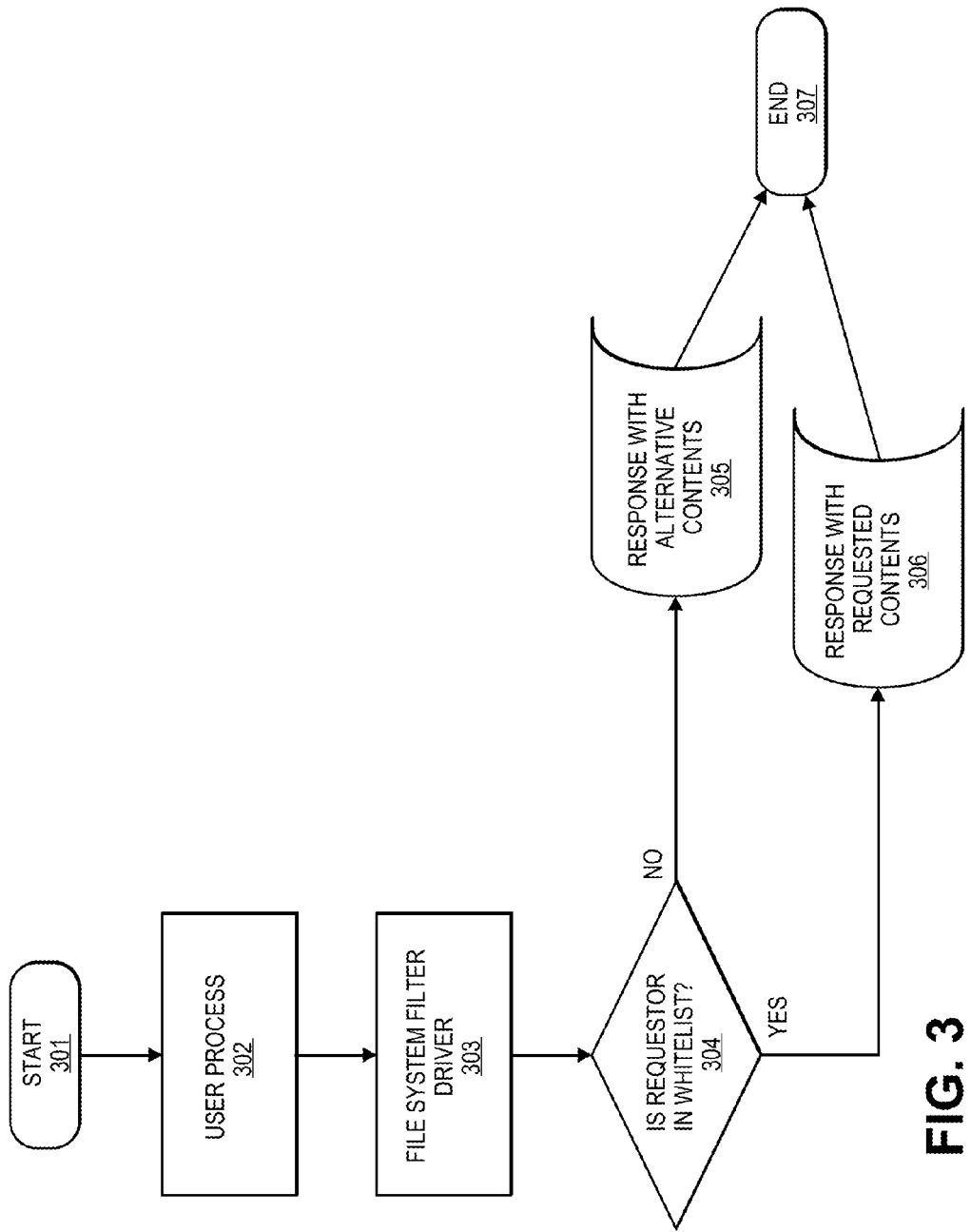
FIG. 3 is a flowchart of a process in accordance with an embodiment.

FIG. 3 is a flowchart of a process in accordance with an embodiment. After start 301, user process 302 sends a request to file system filter driver 303. In operation 304, if the requestor process is on a white list (e.g., the requestor process's name, location, size range, creation date, and/or other properties of the requestor process are on the white list), then a response with the requested contents 306 is returned. Alternatively, if the request process is not on the whitelist or on a blacklist, then a response with alternative contents 305 is returned to the process.

Figure 4:
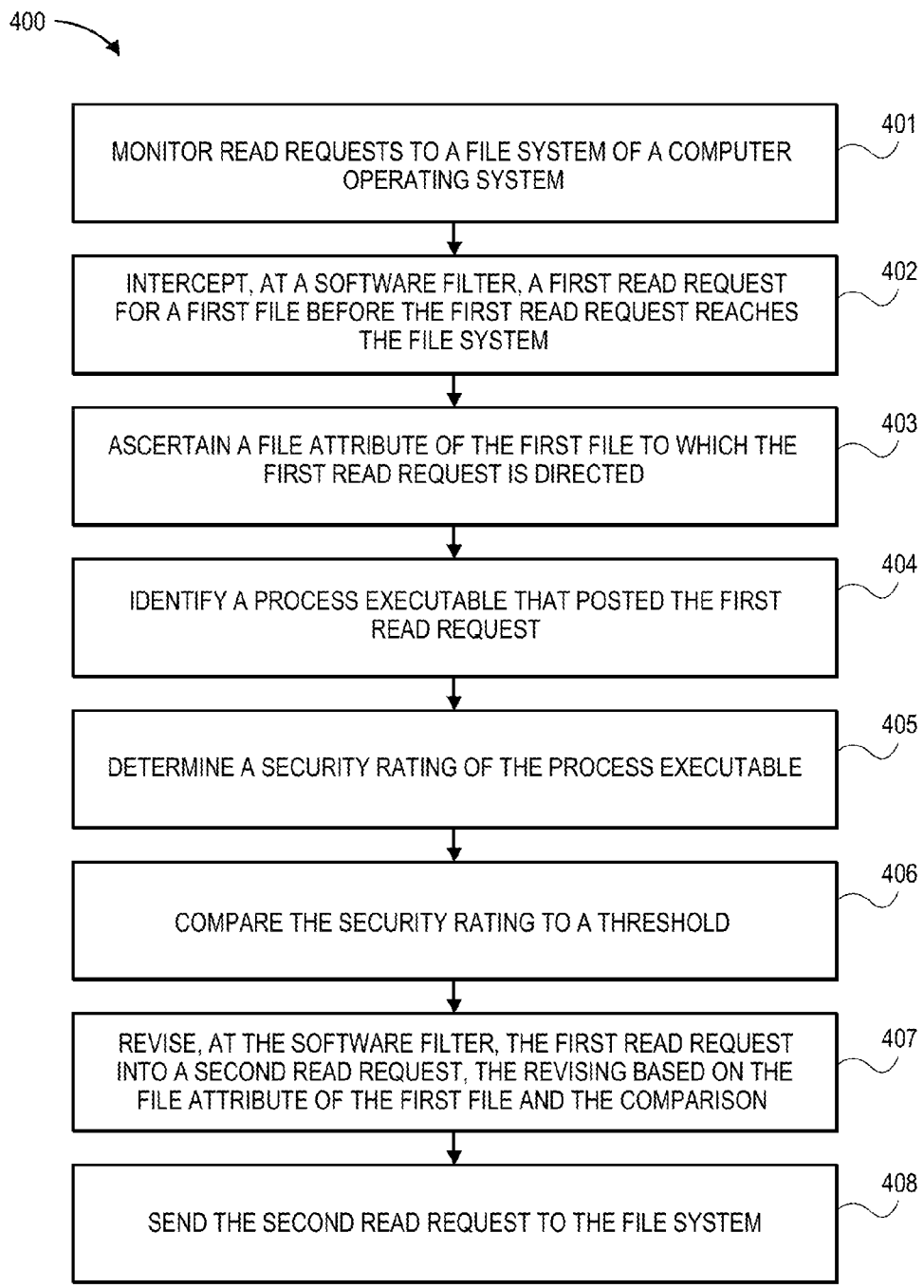
FIG. 4 is a flowchart of a process in accordance with an embodiment.

FIG. 4 is a flowchart of a process in accordance with an embodiment. Process 400 can be implemented by a computer or other machine. In operation 401, read requests to a file system of a computer operating system are monitored. In operation 402, at a software filter, a first read request for a first file is intercepted before the first read request reaches the file system. In operation 403, a file attribute of the first file to which the first read request is directed is ascertained. In operation 404, a process executable that posted the first read request is identified. In operation 405, a security rating of the process executable is determined. In operation 406, the security rating is compared to a threshold. In operation 407, at the software filter, the first read request is revised into a second read request based on the file attribute of the first file and the comparison. In operation 408, the second read request is sent to the file system.

Figure 5:
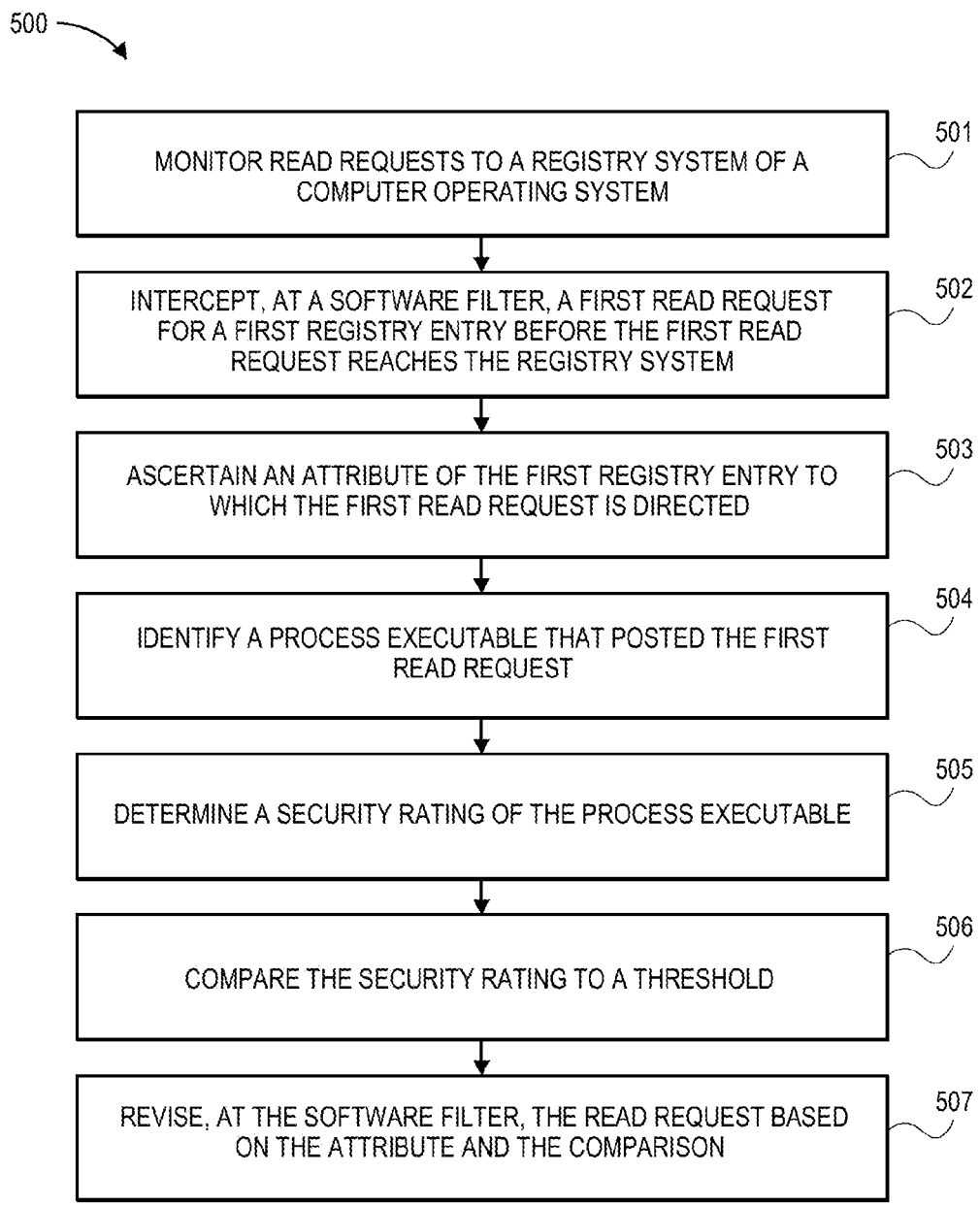
FIG. 5 is a flowchart of a process in accordance with an embodiment.

FIG. 5 is a flowchart of a process in accordance with an embodiment. Process 500 can be implemented by a computer or other machine. In operation 501, read requests to a registry system of a computer operating system are monitored. In operation 502, a first read request for a registry entry is intercepted at a software filter before the read request reaches the registry system. In operation 503, an attribute of the registry entry to which the read request is directed is ascertained. In operation 504, a process executable that posted the read request is identified. In operation 505, a security rating of the process executable is determined. In operation 506, the security rating is compared to a threshold. In operation 507, the read request is revised, at the software filter, based on the attribute and the comparison.

Further methods can be implemented in order to use the false files as decoys and breadcrumbs for hackers to find.

In an embodiment method, one can administer the distribution of decoy contents into common user computer systems. A remotely-administered system can serve to install the above-mentioned obfuscation breadcrumbs onto each user's computing endpoint. The system can be hosted on the network, and is configurable by a network administrator, who will determine the scheduling and contents of such breadcrumbs to be distributed using a centralized push-configure logic.

Contents of such breadcrumbs content with respect to the destination can be created by the administrator manually, and/or automatically created by a system that manufactures content that diverts a hacker to the target honey pot system based on the addresses, services, and accounts that reside the honey pot system. Such contents, e.g., user accounts, can be static or pseudo random for the sake of realism and can be changed and presented differently over time to give the appearance of both ongoing, coordinated, and consistent activity on the different systems.

By following the connections, hackers are drawn into shadow servers that have no real network traffic but instead are used to isolate and analyze the hacker's tools and sophistication.

Generated traffic to a shadow host is preferably believable and contains data that varies from connection to connection, not to mention being different from each shadow agent instance on each installed client. A repeated traffic pattern at the same time from all hosts with a shadow agent installed can be a dead giveaway of a trap.

In many cases one may not have to generate real traffic but rather return files modified by the file system filter driver. A large file, generated over time or where time stamps are added or updated, as part of the filter, can be released progressively with more information based on an increment in time or a specific, absolute time. An attacker may monitor the released portions of the large file, which to him or her appear to be a live updated file. The attacker will do this to verify that there is very recent activity and then track it over time to verify that the machine is currently active. However, this time-based filtering of files merely creates the illusion of ongoing activity.

One may avoid having to generate traffic unless there is no alternative to the creation of a certain type of breadcrumb. Traffic created by a shadow agent to shadow hosts as a "seeder" can be distinguishable from hacker-driven connections to the shadow host. These connections may have undesirable effects on pre-existing host-based IDS.

Types of Breadcrumbs

Common traffic types include: recent documents created and edited by popular programs such as Office components, Adobe, or accounting software; file share e.g. \\server\resource, with password cached; remote desktop destination and password cached; Sharepoint; browser history pointing to decoy internal portals; traditional client, server applications; mailbox .pst files that are not typically read by the user's application; injection of server entries into clients' DNS cache.

The application server hosted on the shadow host should optimally also be believable. A good start would be a file share. However, file shares usually use the same credentials as the production active director (AD). On a Windows systems, local System Account Manager (SAM) fake credentials can be used on the shadow hosts that eliminate the need to interfere/participate in production user password credential stores.

Realism of Shadow Services

A shadow system can identify an attacker once it connects to these servers (where a normal user will likely not accidentally trespass). The connection is presumed guilty unless proven innocent. A server could be as simple as a port listener (or medium interaction shadow hosts), or more realistically a generic fake portal seeded with some files.

Client interaction with a shadow host server would be best presented as if it is human-driven, with time delays and random mistakes in keystroke. Attention to timestamp of records created may suffice for the initial implementations.

A counterpoint raised is that sophisticated client behavior simulation on a shadowbox server is no longer essential. Breadcrumbs guide attackers to a fake server (which is what they are interested in), not a fake desktop (as it is odd that one desktop accesses another desktop's file). A fake server can be as simple as port listener, or simple LISH, or could be as complicated as customer's own honeypot built from a real application server.

Client Management Considerations

To avoid interfering with information technology (IT) processes for debugging and troubleshooting, there should be a way to "reverse" out the impact of a shadow agent. For a file system filter driver that does not change physical file contents but instead modifies returned file data on the fly, exiting the filter driver will revert the system back to normal behavior. For a file system filter driver that depends upon reading altered, shadow files, the alternative content of the files may contain predetermined patterns identifiable to IT for troubleshooting.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable mediums for storing information. The term "computer-readable medium" includes, but is not limited to, portable or fixed storage devices, optical storage devices, wireless channels, a subscriber identity module (SIM) card, other smart cards, and various other mediums capable of storing, containing, or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A computer-implemented method comprising:
   monitoring, by a computing device, read requests for data, wherein the read requests are sent from legitimate and illegitimate applications, wherein an application is associated with a security rating related to an attribute of the application, and wherein an illegitimate application has a security rating above a threshold;
   detecting a read request for particular data;
   determining whether the particular data is important;
   intercepting the read request for the particular data when the particular data is determined to be important, wherein the read request for the particular data is intercepted before the particular data is retrieved;
   identifying an application that sent the read request for the particular data;
   determining the application that sent the read request is illegitimate when a security rating associated with the application is above a threshold;
   revising the read request for the particular data into a read request for alternative data when the application is determined to be illegitimate, wherein revising the read request for the particular data causes the alternative data to be retrieved rather than the particular data; and sending the read request for the alternative data, wherein when the read request for the alternative data is received, the alternative data is retrieved.

2. The method of claim 1, wherein revising the read request includes:

modifying an identification of the particular data to an identification of the alternative data.

3. The method of claim 1, wherein revising the read request is based on an attribute of the particular data.

4. The method of claim 1, wherein the alternative data is generated when the application is determined to be illegitimate.

5. The method of claim 1, wherein the read requests are monitored by a process installed in a kernel space of the computing device.

6. The method of claim 1, wherein the alternative data includes identification data to cause an attacker to be identified.

7. A system comprising:
one or more processors; and
a non-transitory computer-readable medium including instructions that, when executed by the one or more processors, cause the one or more processors to perform operations including:
monitor read requests for data, wherein the read requests are sent from legitimate and illegitimate applications, wherein an application is associated with a security rating related to an attribute of the application, and wherein an illegitimate application has a security rating above a threshold;
detect a read request for particular data;
determine whether the particular data is important;
intercept the read request for the particular data when the particular data is determined to be important, wherein the read request for the particular data is intercepted before the particular data is retrieved;
identify an application that sent the read request for the particular data;
determine the application that sent the read request is illegitimate when a security rating associated with the application is above a threshold;
revise the read request for the particular data into a read request for alternative data when the application is determined to be illegitimate, wherein revising the read request for the particular data causes the alternative data to be retrieved rather than the particular data; and
send the read request for the alternative data, wherein when the read request for the alternative data is received, the alternative data is retrieved.

8. The system of claim 7, wherein revising the read request includes:

modifying an identification of the particular data to an identification of the alternative data.

9. The system of claim 7, wherein revising the read request is based on an attribute of the particular data.

10. The system of claim 7, wherein the alternative data is generated when the application is determined to be illegitimate.

11. The system of claim 7, wherein the read requests are monitored by a process installed in a kernel space of the system.

12. The system of claim 7, wherein the alternative data includes identification data to cause an attacker to be identified.

13. A computer-program product tangibly embodied in a non-transitory machine-readable storage medium, including instructions that, when executed by the one or more processors, cause the one or more processors to:

monitor, by a computing device, read requests for data, wherein the read requests are sent from legitimate and illegitimate applications, wherein an application is associated with a security rating related to an attribute of the application, and wherein an illegitimate application has a security rating above a threshold;
detect a read request for particular data;
determine whether the particular data is important;
intercept the read request for the particular data when the particular data is determined to be important, wherein the read request for the particular data is intercepted before the particular data is retrieved;
identify an application that sent the read request for the particular data;
determine the application that sent the read request is illegitimate when a security rating associated with the application is above a threshold;
revise the read request for the particular data into a read request for alternative data when the application is determined to be illegitimate, wherein revising the read request for the particular data causes the alternative data to be retrieved rather than the particular data; and
send the read request for the alternative data, wherein when the read request for the alternative data is received, the alternative data is retrieved.

14. The computer-program product of claim 7, wherein revising the read request includes:

modifying an identification of the particular data to an identification of the alternative data.

15. The computer-program product of claim 7, wherein revising the read request is based on an attribute of the particular data.

16. The computer-program product of claim 7, wherein the alternative data is generated when the application is determined to be illegitimate.

17. The computer-program product of claim 7, wherein the read requests are monitored by a process installed in a kernel space of the computing device.

* * * * *